United States Patent [19]
Silverman

[11] 3,786,221
[45] Jan. 15, 1974

[54] METHOD FOR HEAT TREATING A POLAR, DIELECTRIC PARISON

[75] Inventor: Alan Silverman, Bridgewater Township, N.J.

[73] Assignee: American Can Company, Greenwich, Conn.

[22] Filed: Mar. 29, 1973

[21] Appl. No.: 346,172

[52] U.S. Cl............. 219/10.57, 219/10.81, 264/27
[51] Int. Cl. ............................................. H05b 9/04
[58] Field of Search................... 219/10.57, 10.81, 219/10.41, 10.43; 264/27, 26, 25; 425/174, 174.8

[56] References Cited
UNITED STATES PATENTS

| | | | |
|---|---|---|---|
| 3,462,582 | 8/1969 | Cines | 219/10.43 |
| 3,128,504 | 4/1964 | Gewecke | 425/174.8 |
| 3,594,862 | 7/1971 | Seefluth | 425/174.4 |

*Primary Examiner*—Bruce A. Reynolds
*Attorney*—Robert P. Auber et al.

[57] ABSTRACT

A method of heat treating an axial zone of a polar, dielectrically lossy, thermoplastic, polymeric parison with a high frequency energy source to produce a temperature gradient across the thickness of the sidewall in said zone prior to blow molding the parison into a bottle, whereby the temperature is higher on the inner surface of the parison sidewall than on the outer surface of the parison sidewall.

18 Claims, 3 Drawing Figures

| DISTANCE FROM OPEN END OF PARISON | DIAMETER OF CENTRAL ELECTRODE | INSIDE DIAMETER OF PARISON | OUTSIDE DIAMETER OF PARISON | DIAMETER OF OUTER ELECTRODE | TEMPERATURE OF CENTRAL ELECTRODE |
|---|---|---|---|---|---|
| 0.131 | .735 | 0.798 | 0.892 | 1.132 | 110°F |
| 1.000 | .736 | 0.800 | 0.870 | 1.110 | |
| 1.375 | .719 | 0.770 | 0.857 | 1.097 | |
| 2.505 | .625 | 0.682 | 0.819 | 1.059 | 115°F |
| 2.945 | .553 | 0.586 | 0.801 | 1.041 | |
| 3.564 | .495 | 0.525 | 0.786 | 1.026 | |
| 4.437 | .407 | 0.430 | 0.784 | 1.024 | |
| 4.916 | .360 | 0.401 | 0.781 | 1.021 | 125°F |
| 5.252 | .282 | 0.358 | 0.560 | 0.800 | |

PATENTED JAN 15 1974 3,786,221

METHOD FOR HEAT TREATING A POLAR, DIELECTRIC PARISON

BACKGROUND OF THE INVENTION

The subject invention relates to heat treating parisons to be blow molded into molecularly oriented bottles and more particularly to a heat treatment of polar, dielectrically lossy parisons prior to said blow molding wherein a temperature gradient is imparted to an axial zone in the sidewall of the parison.

Molecular orientation of thermoplastic polymeric materials is not new. Molecularly oriented film and sheet are widely used and have improved physical properties, including superior impact resistance, increased resistance to creep, increased stiffness, increased resistance to stress rupture and reduced stress crazing, when compared to their unoriented counterparts. Examples of such materials are given in U.S. Pat. No. 3,141,912.

For a given polymer and end use application, there is an optimum level of orientation as determined by orientation release stress (ORS), which may be below the maximum possible orientation level. For example, impact strength may reach a maximum value as the amount of orientation is increased, with additional orientation resulting in a decreased impact strength. Another example of a property which may deteriorate with attempts to achieve high levels of orientation is optical transparency; certain polymers "stress whiten," giving them a milky appearance.

The amount of orientation in an article formed from a polymeric material is affected by the conditions under which the material is oriented. For example, in a tubular article higher levels of circumferential orientation result from increasing the amount of stretch in either the circumferential or axial direction, by increasing the stretching rate, and by decreasing the stretching temperature.

It is known to form plastic bottles by blow-molding a parison, of closed-end tube. While such techniques have met with some success, generally it has not been economically practicable to form bottles for carbonated beverages by this technique. The reason has been that if the bottle is oriented, by stretching, sufficiently to develop the properties required of containers for carbonated beverages (assuming a wall thickness thin enough to be economic), stress whitening has been observed to occur, making the container unsalable. Impact strength is also found to be undesirably low.

Further analysis of this phenomenon has brought the realization that stress whitening, which develops primarily at the inner surface portion of the bottle wall, is due to the fact that the inside of the parison is stretched to a much higher extent, proportionally, than the outside. It has been found that the degree of orientation is not constant across the bottle wall thickness, but on the contrary varies substantially across the wall, and at or near the inner surface portion of the wall is sufficiently high to give rise to the stress whitening.

Accordingly, a method of heat treatment is disclosed in co-pending application Ser. No. 319,380, filed Dec. 29, 1972, for achieving a more uniform circumferential orientation across the thickness of the bottle sidewall by imparting a radial temperature gradient to an axial zone of the sidewall of the parison prior to the parison being blow molded into a bottle whereby, in said zone, the inner surface of the parison is made hotter than the outer surface of the parison. The entirety of said copending application is hereby incorporated by reference.

In order for such a heat treating process to be economical, it must be rapid. The instant invention meets the economic as well as the technological requirements associated with producing a temperature gradient in an axial zone of a polar, dielectrically lossy parison sidewall prior to blowing of the parison into a bottle.

SUMMARY OF THE INVENTION

The instant invention provides a method of heat treating an axial zone of a polar, dielectrically lossy, thermoplastic, polymeric parison and producing a temperature gradient across the thickness of the sidewall in said zone prior to blow-molding the parison into a bottle, which comprises locating said parison between concentrically arranged electrodes, and dielectrically heating the parison with a high frequency energy source to thereby produce said temperature gradient in said zone wherein the temperature is higher on the inner surface of the parison sidewall than on the outer surface of the parison sidewall.

DESCRIPTION OF THE PREFERRED EMBODIMENT

Figure 1:
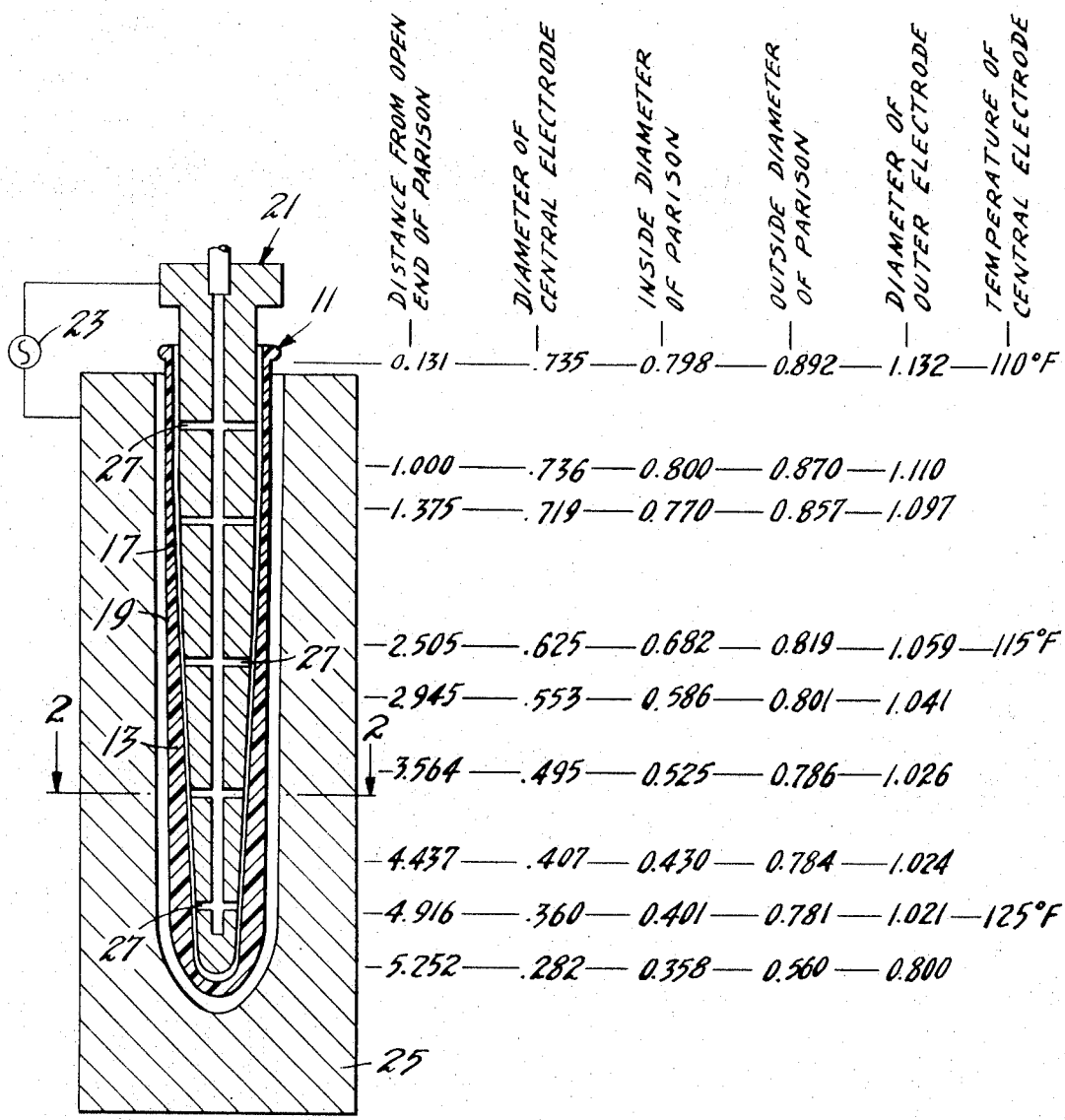
FIG. 1 is a central, vertical sectional view of concentrically arranged electrodes and the parison to be heated therebetween.
Figure 2:
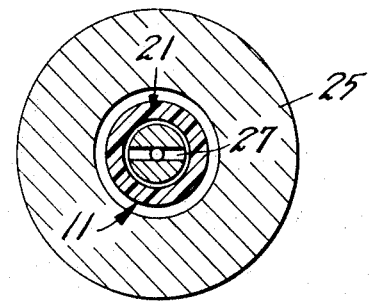
FIG. 2 is a sectional view on the horizontal plane inidcated by the line 2—2 of FIG. 1.

The present invention is preferably utilized in the production of a molecularly oriented bottle by blow-molding from a thermoplastic parison. It has been found that the temperature gradient to be established in the parison in order to produce a more uniformly oriented blown bottle is affected by the relative amounts of stretch of the inner and outer surfaces of the parison in the blowing operation, by the stretching rate, and by the average temperature of thermoplastic material during the blowing operation. The temperature gradient is greater for a large relative amount of stretch, a lower stretching rate and a higher blowing temperature.

The amount of stretch of the inner surface of the parison during the process of forming the parison into a blow-molded article may be expressed in terms of an "inside stretch ratio," SR(i), which is the ratio of the inside diameter of the blown article at any given axial location to the inside diameter of that portion of the parison which was formed into the article at the axial location where the article's diameter was measured. The amount of stretch of the outer surface of the parison may similarly be expressed in terms of an "outside stretch ratio," SR(o). In the case of a non-circular cross-sectional shape of the parison or the blown-article, the effective diameter may be used to obtain the respective stretch ratios.

It can easily be shown that the inner surface of the parison sidewall is, in fact, stretched more than the outer surface of the parison sidewall in the course of blowing the bottle. The extent to which SR(i) is greater than SR(o) is a measure of the relative amounts of stretch of the inner and outer surfaces of the parison.

If, during the blowing operation, there is a uniform temperature across the thickness of the sidewall of the parison, the inside portion of the blown article's sidewall will be substantially more highly oriented than the outside because, relative to the outside portion, the inside is stretched to a greater extent.

The parison is heat treated in accordance with the present invention to compensate for the relative difference in amounts of stretch of the parison sidewall from the inner to the outer portions thereof. Since less orientation occurs, for a given amount of stretch, at a higher stretching temperature, a temperature gradient is imparted to the parison sidewall prior to the blowing operation, with the temperature of the inner surface being greater than that of the outer surface.

It has been found that, in order to produce a blown bottle in which the maximum circumferential ORS at any axial location in the bottle sidewall is less than about twice the minimum ORS at that location, the temperature gradient across the parison sidewall, in Farenheit degrees, at the corresponding axial location in the parison, should be from about:

$$25([SR(i)/SR(o)] - 1)$$

to about:

$$150([SR(i)/SR(o)] - 1)$$

A preferred range of the temperature gradient in Farenheit degress is from about:

$$75([SR(i)/SR(o)] - 1)$$

to about:

$$125([SR(i)/SR(o)] - 1)$$

For the parison of the type illustrated in FIG. 1, the most preferred temperature gradient, in Farenheit degrees, in an axial zone of the parison is determined according to the formula:

$$100([SR(i)/SR(o)] - 1).$$

For purposes of this specification, the orientation release stress is determined according to an adaptation of ASTM Test D 1504. In this method, bottles are first conditioned at 72° F. ($\pm$ 5° F.) at 50 percent relative humidity ($\pm$ 10 percent) for about 6 hours. The bottle specimens are prepared as follows:

The tops and bottoms of a given bottle are removed by cutting with a band saw. Annular rings of approximately ⅛ inch width and approximately 20 to 30 mils thick in an axial zone are cut off with a lathe in sequence from the resulting cylindrical section of the bottle wall. After the edges of each annulus are filed to remove flash material, the maximum and minimum thicknesses of each are measured in the region to be analyzed.

To obtain "inside" specimens which will provide information of the average circumferential direction orientation near the inner surface of the bottle wall, an annulus is slipped over a mandrel mounted on a lathe and material is removed from the outside surface in 2.5 mil steps, thereby resulting in an annulus thickness of about 10 mils. The lathe is operated at a lineal speed of 250 feet per minute at the cutting tool. The last few mils of material are always removed on a milling machine according to the procedure described below.

To obtain "outside" specimens from which the average circumferential direction orientation near the outer surface of the bottle wall can be determined, an annulus is slipped into a collet mounted on the lathe and the material is removed from the inside surface in 2.5 mil steps, to give an annulus thickness of about 10 mils. An additional few mils of material are then removed on a milling machine.

To obtain "middle" specimens which provide a measure of the average circumferential direction orientation midway through the thickness of the bottle sidewall, material is first removed from the inside of the annulus as set forth above to give a thickness of 15 to 20 mils. An almost equal amount of material is then removed from the outside of the annulus as set forth above to give "middle" specimens approximately 10 mils thick.

The final step in sample preparation is milling of the annuli to assure reasonably uniform cross-sections. This is accomplished by cutting each of these annuli so that the resulting three strips can be mounted via double-faced masking tape onto an aluminum block previously locked onto the table of the milling machine and "faced off" to assure parallel positioning of the samples to be milled. The milling operation is performed on the specimens by removing only about 1 mil of material per pass unitl 1 mil from the required 6 to 7 mil thickness, followed by 1/3 mil steps so that the desired thickness is achieved. The slowest machine cross head speed, 9/16 inches/minute, is used in conjunction with the two-fluted end mill 3/4 inch in diameter, rotating at 1150 rpm. The three specimens are then stripped from the mounting plate, cut into minimum 1 inch lengths and the maximum and minimum thickness measured with a micrometer. These specimens are now ready for the actual measurement of ORS according to ASTM Test D 1504. In the modified procedure employed herein, samples are immersed in a 133° silicone oil bath.

Parisons heat treated by the method of this invention can be produced from any polar or dielectrically lossy thermoplastic, such as polyvinyl chloride, certain polyesters, and the so-called "barrier resins," and more particularly from those which are glassy and non-crystalline at room temperature, such as the previously mentioned polyvinyl chloride and the so-called "barrier resins." Dielectrically lossy thermoplastics are, for the purpose of this specification, to be defined as those whose dielectric loss tangents are greater than 0.02 at room temperature measured at 30 megacycles per second.

The present invention is particularly applicable to the production of plastic bottles containing fluids under a high internal pressure, such as, for example, beer, carbonated beverages and aerosol container products. Such bottles require that the polymeric material from which the bottle is formed have a low permeability to gases such as carbon dioxide.

Polymers suitable for blowing into bottles are prepared by polymerizing a major portion of an olefinically unsaturated nitrile, such as acrylonitrile, and a minor portion of an ester of an olefinically saturated carboxylic acid, such as ethyl acrylate, in the presence of a rubber containing a major proportion of a conjugated diene monomer, such as butadiene, and a minor proportion of an olefinically unsaturated nitrile, such as acrylonitrile.

The conjugated diene monomers useful in the preparation of such polymers include 1,3-butadiene, isoprene, chloroprene, bromoprene, cyanoprene, 2,3-dimethyl-1,3-butadiene, 2-ethyl-1,3-butadiene, 2,3-diethyl-1,3-butadiene and the like.

The olefinically unsaturated nitriles useful in the preparation of such polymers are the alpha,beta-olefinically unsaturated mononitriles having the structure

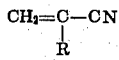

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like.

The esters of olefinically unsaturated carboxylic acid useful in the preparation of such polymers are preferably the lower alkyl esters of alpha,beta-olefinically unsaturated carboxylic acids and more preferred are the esters having the structure

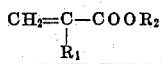

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the pentyl acrylates, and the hexyl acrylates, methyl methacrylate, ethyl methacrylate, the propyl methacrylates, the butyl methacrylates, the pentyl methacrylates, and the hexyl methacrylates, methyl alphachloroacrylate, ethyl alpha-chloroacrylate and the like.

The more preferred polymers are derived from (A) about 60 to 90 parts by weight of an alpha,beta-olefinically unsaturated mononitrile having the structure $CH_2 = C(-R_1)-CN$ where $R_1$ is selected from the group consisting of hydrogen, halogen, and the lower alkyl groups, (B) about 40 to 10 parts by weight of an ester of an olefinically unsaturated carboxylic acid having the structure $CH_2=C(-R_1)-C(O)-O-R_2$ where $-R_1$ is as defined above and $-R_2$ is an alkyl group having from 1 to 6 carbon atoms, (A) and (B) together comprising 100 parts by weight, polymerized in the presence of (C) about 1 to 20 parts by weight of a nitrile rubber containing about 60 to 80 per cent by weight of moieties derived from a conjugated diene monomer and about 40 to 20 percent by weight of moieties derived from a mononitrile having said $CH_2 = C(-R_1)-CN$ structure.

The most preferred polymers are derived from about 60 to 90 parts by weight of acrylonitrile or methacrylonitrile and about 40 to 10 parts by weight of an ester selected from the group consisting of methyl acrylate, ethyl acrylate and methyl methacrylate, polymerized in the presence of about 1 to 20 additional parts by weight of a nitrile rubber containing about 60 to 80 percent by weight butadiene or isoprene moieties and about 40 to 20 percent by weight of acrylonitrile or methacrylonitrile moieties.

More specifically, the most preferred polymers are derived from about 73 to 77 parts by weight acrylonitrile and 27 to 23 parts by weight methyl acrylate, polymerized in the presence of 8 to 10 additional parts by weight of a nitrile rubber containing about 70 percent by weight butadiene moieties and about 30 percent by weight acrylonitrile moieties.

Further examples of such polymers may be found in U.S. Pat. No. 3,426,102, the entirety of which is hereby incorporated into the instant specification by reference.

Figure 3:
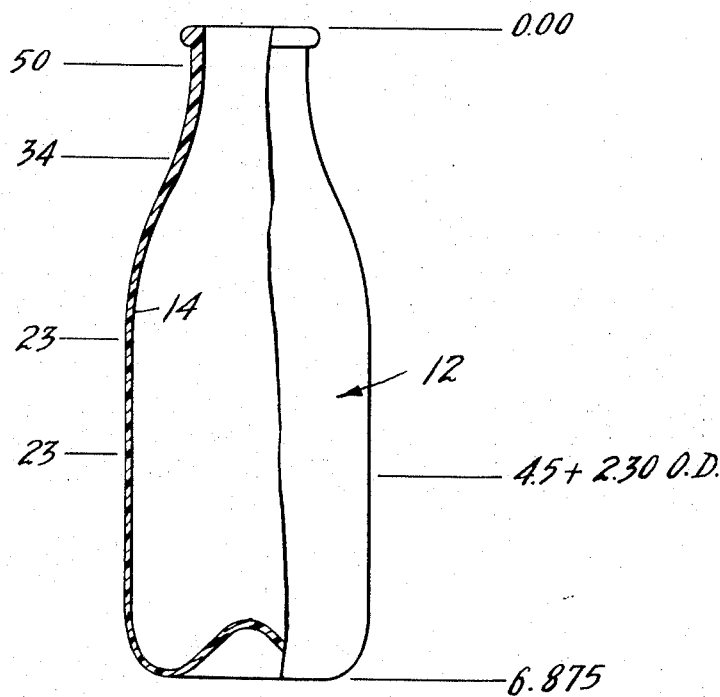
FIG. 3 is a partial central vertical sectional view and partial elevational view of a bottle blow-molded from the parison shown in FIG. 1.

The instant invention is best utilized in the heat treating of a parison to be blow molded into a bottle suitable for containing beer or carbonated beverage. Accordingly, the parison 11 shown in FIG. 1 to be blown into a bottle 12 shown in FIG. 3 is formed by injection molding a thermoplastic polymer derived from 75 parts by weight acrylonitrile and 25 parts by weight methyl acrylate polymerized in the presence of 9 additional parts by weight of a nitrile rubber containing about 70 percent by weight 1,3-butadiene and about 30 percent by weight acrylonitrile. Injection molding is a technique used for forming a parison having a particular material distribution, as shown in FIG. 1, but any of the conventional parison forming techniques may be employed.

The next step comprises a novel heat treatment wherein a temperature gradient is imparted across the thickness of the sidewall 13 of the parison 11 by means of high frequency electromagnetic energy whereby the parison sidewall 13 becomes hotter on its inner surface 17 than on its outer surface 19. Preferably, the frequency is radio frequency, and the most preferred frequency range is between $10^7$ and $10^8$ cycles per second. An inner electrode 21, which is also the blowing core pin, having apertures 27 for high pressure fluid utilized in the subsequent blow molding, is located within the parison 11 (which is a polar, lossy dielectric), and is connected, by means of a source 23 of radio frequency energy to an outer electrode shell 25 which surrounds the parison 11. The dissipation of radio frequency energy by the dielectric causes localized heating of the parison 11, which increases along a radial path inwardly toward the inner parison surface 17.

More particularly, for parisons of circular cross-section, the rate of dissipation of energy per unit volume of polymer at any point is inversely proportional to the distance measured radially outward to that point from the long axis of the parison 11. This rate is also proportional to the voltage applied to the electrodes 21 and 25 and to the specific dielectric properties of the polymeric parison and of the dielectric or dielectrics which occupy the spaces between the parison 11 and the electrodes 21 and 25.

It should also be noted that the axial temperature profile of the parison will generally be so varied as to accomodate the axially varying thickness of the parison sidewall and to control the manner in which the parison inflates. The method of this invention is particularly well-suited to imparting such axial temperature variations to the parison, inasmuch as the relative spacing between the parison 11 and the concentric electrodes 21 and 25 along the parison axis can be adjusted to provide the desired temperatures. The radial temperature gradients along the long axis of the parison will vary accordingly. It can be shown that, to a first approximation, the value of the changing radial gradient along the axis of the parison is proportional to the corresponding change in the relative differences in stretching between the inside and outside of the parison sidewall.

The heat treating process described above is dependent upon the proper choice of electrode dimensions. For a parison of given dimensions and dielectric properties, suitable electrode dimensions may be determined by experimental trial and error. Such an approach, however, is exceedingly time consuming and laborious. We have found a more efficient approach to the problem of determining electrode dimensions by utilizing a mathematical equation which describes the amounts of power dissipated in the dielectric parison. This equation, when coupled with a suitable heat transfer analysis, approximately predicts the degree of heating within the dielectric parison for any electrode configuration subject to the qualifications noted below. In particular, most parisons' geometries approximate right circular cylindrical annuli which may be closed at one end. The equation assumes, therefore, that the dielectric parison is a right circular cylindrical annulus interposed between electrodes which are concentric right circular cylinders. Owing to imperfect knowledge of the physical and electrical properties of the dielectric material and to the aforementioned approximations, electrode dimensions predicted by this equation must be corrected experimentally.

The power dissipation per unit volume, at any radial point within dielectric materials in annular arrangement between concentric, right circular cylindrical electrodes is given by the equation:

$$P_n = \frac{V_o^2 \omega \epsilon_o \epsilon_n (\tan \delta_n)}{2[r \ln (r_{n+1}/r_n)]} \left[\frac{(ReZ_n)^2 + (ImZ_n)^2}{(ReZ_t)^2 + (ImZ_t)^2}\right]$$

$P_n$ = Power dissipation/unit volume in the $n^{th}$ annular dielectric layer
$V_o$ = applied voltage (root mean square)
$\omega$ = angular frequency of applied electric field
$\epsilon_o$ = permittivity of free space
$\epsilon_n$ = dielectric constant of the $n^{th}$ annular dielectric layer
$(\tan \delta_n)$ = loss tangent of the $n^{th}$ annular dielectric layer
$r$ = radial position within the $n^{th}$ dielectric layer
$r, r_{n+1}$ = radial boundaries of the $n^{th}$ annular dielectric layer
$Z$ = electrical impedance = $ReZ + ImZ$
$ReZ_n$ = real part of the electrical impedance of the $n^{th}$ annular dielectric layer
$ImZ_n$ = imaginary part of the electrical impedance of the $n^{th}$ annular dielectric layer
$ReZ_t$ = total real part of the electrical impedance of the dielectric media positioned between the right circular cylindrical electrodes
$ImZ_t$ = total imaginary part of the electrical impedance of the dielectric media positioned between the right circular cylindrical electrodes Where $$ReZ_n = \frac{\tan \delta_n}{\omega C_n (\tan^2 \delta_n + 1)}$$

and $$I_m Z_n = \frac{1}{\omega C_n (\tan^2 \delta_n + 1)}$$

for which $C_n = 2\pi\epsilon_o\epsilon_n L/l_n (r_{n+1}/r_n)$ = capacitance of $n^{th}$ annular dielectric layer where $L$ = a measure of length along the common axis of the right circular cylindrical electrodes.

Also:

$ReZ_t = ReZ_1 + ReZ_2 + \ldots + ReZ_n + \ldots + ReZ_n$

And:

$ImZ_t = ImZ_1 + ImZ_2 + \ldots + ImZ_n + \ldots ImZ_n$

Where $N$ = total number of annular layers.

The parison 11 with the temperature gradient produced by the method of this invention is then blow-molded in the leathery state with an increasing pressure to a maximum pressure which reaches about 200 p.s.i. in about 15 seconds to produce the bottle 12 whose sidewall 14 has an average circumferential orientation release stress which is substantially uniform radially when compared to bottles blown from similar parisons heated conventionally.

The above procedure may be utilized to produce various average levels of orientation. Average circumferential orientation levels between 350 and 2500 p.s.i., and especially between 500 and 1600 p.s.i. achieved utilizing the temperature gradient, may be realized which are substantially uniform radially across the sidewall of the bottle.

That a temperature gradient can be produced in a polar, dielectric thermoplastic polymer by the method described above is demonstrated below. A parison of the type shown in FIG. 1 was injection molded from a polymer comprised of 75 parts by weight acrylonitrile and 25 parts by weight methyl acrylate polymerized in the presence of 9 additional parts by weight of a nitrile rubber containing about 70 percent by weight 1,3-butadiene and about 30 percent by weight acrylonitrile.

The heating apparatus employed was arranged approximately as shown in FIG. 1, the electrodes being made of half-hard brass. The source 23 of high frequency energy was a model L14E generator supplied by the New Jersey Electronic Corp., Clifton, New Jersey. The parison was heat treated at about 42 percent of the maximum power setting at 30 megacycles for about 12 seconds. This power setting is believed to generate a voltage applied across the electrodes 21 and 25 on the order of 1500 – 2000 volts.

The parison was provided with three holes so located as to permit measurement by thermocouples of the inside, middle and outside sidewall temperatures of the parison at a point about 5 inches from the open end of the parison shown in FIG. 1. The holes, which were of diameter 0.030 inch, were located on circles midway between and 0.025 inch from the inner and outer sidewall surfaces. Since total thickness of the parison employed was 0.190 inch at the place these holes were located, the thickness over which the temperature difference was measured was therefore 0.140 inch. The parison was heat treated as described above and thermocouples as soon thereafter as possible were inserted into the holes. The earliest data thus measured correspond to approximately 12 – 15 seconds after completion of the heat treatment step, and are given in Table I below.

More important are the temperatures in the earlier seconds after heat treatment during which blow-molding is initiated, which temperature are not amenable to direct measurement. Calculations from heat transfer equations, however, provide the necessary information, and these data likewise are presented in the table below. It can be seen that an initial radial temperature gradient of over 80° F. was obtained across the thickness of 0.140 inches, or about 0.6° F. per mil.

TABLE I

TEMPERATURE GRADIENTS IN A PARISON HEATED BY

RADIO FREQUENCY ENERGY USING CONCENTRIC ELECTRODES

|  |  | Initial | 0 Sec. After Heating | 12 Sec. After Heating | 15 Sec. After Heating |
|---|---|---|---|---|---|
| Calculated | Inside | 75 | 237 | — | 206 |
| Temp. | Middle | 75 | 188 | — | 183 |
| (°F) | Outside | 75 | 155 | — | 166 |
| Measured | Inside | 75 | — | 206 | 198 |
| Temp. | Middle | 75 | — | 188 | 189 |
| (°F) | Outside | 75 | — | 170 | 170 |

Employing the given equation concurrently with a heat transfer analysis, a set of electrodes 21 and 25 as seen in FIG. 1 was designed for the parison 11 of FIG. 1 wherein temperatures within the parison 11 were established suitable for subsequent inflation to form a bottle whose sidewall is more uniformly oriented than would be obtained from blow-molding a similar bottle from a similar parison conventionally heated. The inner diameter of the outer electrode 25 was assumed to be everywhere larger by 0.240 inches than the outer diameter of the parison 11. Then, for estimated dimensions for the central electrode, as shown in Table II, for a voltage of 3,300 volts applied across the electrodes 21 and 25 for a period of 10 seconds, temperatures within the sidewall of the parison 11 are predicted which are shown in Table II. By experimental modification of these dimensions we obtained an electrode 21 of the dimensions of FIG. 1 by means of which parisons were properly heated for inflation into bottles more uniformly oriented in the sidewall thereof than would have been obtained from the blow-molding of similar parisons heated conventionally. The dimensions of this electrode can be seen from FIG. 1 to differ by not more than five per cent from the predicted values. The parisons were heated in the arrangement of FIG. 1 wherein the source of radio frequency energy was the model L14E generator designed to operate at 30 megacycles per second previously described. The generator was set to provide about 56 percent of maximum power for about 10 seconds. Since the voltage across the electrodes at a given power setting is dependent upon the state of tuning of the generator, a procedure for establishing the voltage across the electrodes is given as follows:

TABLE II

| Distance From Open End | Estimated Dimensions[1] of Central Electrode | Predicted Temperatures (2) Within Parison Sidewall | | |
|---|---|---|---|---|
|  |  | Inner Surface | Middle | Outer Surface |
| 1.000 | 0.730 | 183 | 185 | 183 |
| 1.375 | 0.705 | 186 | 188 | 186 |
| 2.505 | 0.655 | 180 | 186 | 181 |
| 2.945 | 0.555 | 211 | 196 | 175 |
| 3.564 | 0.480 | 219 | 191 | 167 |
| 4.437 | 0.400 | 291 | 195 | 157 |
| 4.916 | 0.370 | 315 | 191 | 150 |

[1] All Dimensions in inches.
[2] All temperatures in Fahrenheit degrees.

A Peak Radio Frequency Kilovoltmeter as supplied by Thermatron Div., Solidyne Corp., Bayshore, N.Y., is connected to the electrode to which high voltage is applied, e.g., electrode 25, and is grounded. The connection to the electrode 25 should be straight, solid copper wire. Voltages should be measured at several power settings and for several lengths of connector. The voltage at zero-length of connector may then be determined by graphical extrapolation for any power setting, and the desired power settings thereby determined by interpolation. The zero-lead length voltage corresponding to the setting of 56 percent of max. power at the state of tuning employed in the heating of the parisons described above was about 4300 volts. That the voltage measured by this means need not correspond to the actual voltage applied during the heating of parisons will be understood to result from an interaction of the measuring means with the state of tune of the generator.

It should be noted that although the drawings indicate air gaps between the parison 11 and the electrodes 21 and 25, that dielectrics other than air could also be employed to replace or to partly replace these air gaps. Thereby it is possible to modify further the intensity of the field generated between the electrodes. It is generally not desirable, for most parison shapes, to utilize the electrodes 21 and 25 in complete contact with the parison 11 on its entire inner and outer surfaces.

The instant invention is applicable for any bottle sidewall thickness, but is especially useful for thicknesses between 5 and 60 mils, and particularly between 15 and 35 mils. The invention is also applicable for any parison, especially those whose sidewall thickness in an axial zone being heat treated is between 100 and 250 mils. Temperature gradients between 10° and 250° F. have been found useful, and particularly useful are gradients between 40° and 150° F.

The molecular orientation temperature range of an essentially non-crystalline thermoplastic polymer useful in the practice of the present invention is that temperature range above the glass transistion temperature in which the polymer is rubbery or leathery. The highest degree of molecular orientation is obtained by stretching the polymer when it is in the leathery state, viz. where its behavior is retarded highly elastic, which is evidenced when the polymer, when subjected to a stress, undergoes a small, instantaneous strain followed by a much larger strain over a relatively long period of time. The orientation temperature range of the polymer described in the examples is about 170° F to about 275° F.

It is thought that the invention and many of its attendant advantages will be understood from the foregoing description and it will be apparent that various changes may be made in the steps of the process (method) described and their order of accomplishment without departing from the spirit and scope of the invention or sacrificing all of its material advantages, the process (method) hereinbefore described being merely a preferred embodiment thereof.

What is claimed is:

1. A method of heat treating an axial zone of a polar, dielectrically lossy, thermoplastic, polymeric parison and producing a temperature gradient across the thickness of the sidewall in said zone prior to blow molding the parison into a bottle, comprising:
   locating said parison between concentrically arranged electrodes; and
   dielectrically heating the parison with a high frequency energy source to thereby produce said temperature gradient in said zone wherein the temperature is higher on the inner surface of the parison sidewall than on the outer surface of the parison sidewall.

2. The method of claim 1 wherein the temperature gradient in Fahrenheit degrees in said axial zone is in the range from about $$25([SR(i)/SR(o)] - 1)$$

to about $$150([SR(i)/SR(o)] - 1)$$

where $SR(i)$ is the ratio of the inner diameter of the bottle in said zone to the inner diameter of that portion of the parison from which said zone of the bottle was formed, and where $SR(o)$ is the ratio of the outer diameter of the bottle in said zone to the corresponding outer diameter of the parison.

3. The method of claim 1 wherein the temperature gradient in Fahrenheit degrees in said axial zone is in the range from about $$75([SR(i)/SR(o)] - 1)$$

to about $$125([SR(i)/SR(o)] - 1)$$

where $SR(i)$ is the ratio of the inner diameter of the bottle in said zone to the inner diameter of that portion of the parison from which said zone of the bottle was formed, and where $SR(o)$ is the ratio of the outer diameter of the bottle in said zone to the corresponding outer diameter of the parison.

4. The method of claim 3 wherein the temperature gradient in Fahrenheit degrees in said axial zone is determined according to the formula:

$$100([SR(i)/SR(o)] - 1).$$

5. The method of claim 3 wherein the concentrically arranged electrodes are circular in cross section.

6. The method of claim 3 wherein the thickness of the sidewall in said axial zone is between 100 and 250 mils.

7. The method of claim 3 wherein the temperature gradient is between 10° and 250° Fahrenheit.

8. The method of claim 3 wherein there is an air gap between the parison and the elctrodes.

9. The method of claim 8 wherein the air gap is filled or partially filled with one or more dielectric materials other than air.

10. The method of claim 1 wherein the polymer is derived from (A) about 60 to 90 parts by weight of an alpha,beta-olefinically unsaturated mononitrile having the structure $CH_2 = C(-R_1)-CN$ where $R_1$ is selected from the group consisting of hydrogen, halogen, and lower alkyl groups, (B) about 40 to 10 parts by weight of an ester of an olefinically unsaturated carboxylic acid having the structure $CH_2 = C(-R_1)-C(O)O-R_2$ where $-R_1$ is as defined above and $-R_2$ is an alkyl group having from 1 to 6 carbon atoms, (A) and (B) together comprising 100 parts by weight, polymerized in the presence of (C) about 1 to 20 parts by weight of a nitrile rubber containing about 60 to 80 percent by weight of moieties derived from a conjugated diene monomer and about 40 to 20 percent by weight of moieties derived from a mononitrile having said $CH_2 = C(-R_1)-CN$ structure.

11. The method of claim 10 wherein the mononitrile is acrylonitrile or methacrylonitrile, the ester is selected from the group consisting of methyl acrylate, ethyl acrylate and methyl methacrylate, and the conjugated diene monomer is butadiene or isoprene.

12. The method of claim 11, wherein the polymer is derived from 73 to 77 parts by weight acrylonitrile and 27 to 23 parts by weight of methyl acrylate, polymerized in the presence of 8 to 10 additional parts by weight of a nitrile rubber containing about 70 percent by weight butadiene moieties and about 30 percent by weight acrylonitrile moieties.

13. The method of claim 1 wherein the temperature gradient is between about 40° and 150° F.

14. The method of claim 1 wherein the parison is injection molded.

15. The method of claim 1 wherein the frequency is radio frequency.

16. The method of claim 15 wherein the frequency is between $10^7$ and $10^8$ cycles per second.

17. The method of claim 1 wherein the polymer has a dielectric loss tangent greater than 0.02 at room temperature measured at 30 megacycles per second.

18. The method of claim 17 wherein the electrodes are half-hard brass.

* * * * *